(12) United States Patent
Dash et al.

(10) Patent No.: US 7,424,742 B1
(45) Date of Patent: Sep. 9, 2008

(54) DYNAMIC SECURITY EVENTS AND EVENT CHANNELS IN A NETWORK SECURITY SYSTEM

(75) Inventors: Debabrata Dash, Sunnyvale, CA (US); Christian Beedgen, San Jose, CA (US)

(73) Assignee: ArcSight, Inc., Cupertino, CA (US)

( * ) Notice: Subject to any disclaimer, the term of this patent is extended or adjusted under 35 U.S.C. 154(b) by 687 days.

(21) Appl. No.: 10/976,075

(22) Filed: Oct. 27, 2004

(51) Int. Cl.
*G06F 11/00* (2006.01)
(52) U.S. Cl. .......................................... 726/22; 716/23
(58) Field of Classification Search ............. 726/22–26; 709/224–225; 713/150
See application file for complete search history.

(56) References Cited

U.S. PATENT DOCUMENTS

| | | | |
|---|---|---|---|
| 5,717,919 | A | 2/1998 | Kodavalla et al. |
| 6,134,664 | A | 10/2000 | Walker |
| 6,192,034 | B1 | 2/2001 | Hsieh et al. |
| 6,321,338 | B1 | 11/2001 | Porras et al. |
| 6,408,391 | B1 | 6/2002 | Huff et al. |
| 6,408,404 | B1 | 6/2002 | Ladwig |
| 6,484,203 | B1 | 11/2002 | Porras et al. |
| 6,687,832 | B1 * | 2/2004 | Harada et al. .................. 726/22 |
| 6,694,362 | B1 | 2/2004 | Secor et al. |
| 6,704,874 | B1 | 3/2004 | Porras et al. |
| 6,708,212 | B2 | 3/2004 | Porras et al. |
| 6,711,615 | B2 * | 3/2004 | Porras et al. ................. 709/224 |
| 6,711,686 | B1 * | 3/2004 | Barrett ........................ 709/221 |
| 6,839,850 | B1 | 1/2005 | Campbell et al. |
| 6,966,015 | B2 | 11/2005 | Steinberg et al. |
| 6,988,208 | B2 | 1/2006 | Hrabik et al. |
| 7,043,727 | B2 | 5/2006 | Bennett et al. |
| 7,089,428 | B2 | 8/2006 | Farley et al. |
| 7,171,689 | B2 | 1/2007 | Beavers |
| 2002/0019945 | A1 | 2/2002 | Houston et al. |
| 2002/0099958 | A1 | 7/2002 | Hrabik et al. |

(Continued)

FOREIGN PATENT DOCUMENTS

WO WO 02/45315 A2 6/2002

(Continued)

OTHER PUBLICATIONS

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

(Continued)

*Primary Examiner*—Hosuk Song
(74) *Attorney, Agent, or Firm*—Fenwick & West LLP

(57) ABSTRACT

A query for security event can be represented as an event channel. The event channel may be displayed as a grid of events. In one embodiment, the events included in the event channel are dynamic and can change after initial observation. In one embodiment, the present invention includes creating an event channel defined by a timeframe and an event filter, the event channel including security events stored in an event database that satisfy the timeframe and the event filter. When a security event changes after the event channel has been created, one embodiment of the invention further includes observing a change to a security event stored in the event database, and dynamically updating the event channel based on the observed change.

29 Claims, 6 Drawing Sheets

U.S. PATENT DOCUMENTS

| | | |
|---|---|---|
| 2002/0104014 A1 | 8/2002 | Zobel et al. |
| 2002/0147803 A1 | 10/2002 | Dodd et al. |
| 2002/0184532 A1 | 12/2002 | Hackenberger et al. |
| 2003/0093514 A1 | 5/2003 | Valdes et al. |
| 2003/0093692 A1 | 5/2003 | Porras |
| 2003/0101358 A1 | 5/2003 | Porras et al. |
| 2003/0188189 A1 | 10/2003 | Desai et al. |
| 2003/0221123 A1 | 11/2003 | Beavers |
| 2004/0010718 A1 | 1/2004 | Porras et al. |
| 2004/0024864 A1 | 2/2004 | Porras et al. |
| 2004/0044912 A1 | 3/2004 | Connary et al. |
| 2004/0221191 A1 | 11/2004 | Porras et al. |
| 2005/0027845 A1 | 2/2005 | Secor et al. |
| 2005/0204404 A1 | 9/2005 | Hrabik et al. |
| 2006/0069956 A1 | 3/2006 | Steinberg et al. |

FOREIGN PATENT DOCUMENTS

| | | | |
|---|---|---|---|
| WO | WO 02/060117 A1 | 8/2002 | |
| WO | WO 02/078262 A1 | 10/2002 | |
| WO | WO 02/101988 A2 | 12/2002 | |
| WO | WO 03/009531 A2 | 1/2003 | |
| WO | WO 2004/019186 A2 | 3/2004 | |

OTHER PUBLICATIONS

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in *SRI International, Inc. v. Internet Security Systems, Inc. and Symantec Corporation* (D. Del., Civ. No. 04-1199-SLR), Oct. 17, 2006.

Valdes, A., et al., "Statistical Methods for Computers Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

U.S. Appl. No. 60/405,921, filed Aug. 26, 2002, Gisby et al.

ArcSight, "About ArcSight Team," date unknown, [online] [Retrieved on Oct. 25, 2002] Retrieved from the Internet <URL: http://www.arcsight.com/about_team.htm>.

ArcSight, "About Overview," Oct 14, 2002, [online] [Retrieved on Apr. 21, 2006] Retrieved from the Internet <URL: http://web.archive.org/web/20021014041614/http://www.arcsight.com/about.htm>.

ArcSight, "Contact Info," date unknown, [online] [Retrieved on Oct. 25, 2002] Retrieved from the Internet <URL: http://www.arcsight.com/contact.htm>.

ArcSight, "Product Info: Product Overview and Architecture," date unknown, [online] [Retrieved on Oct. 25, 2002] Retrieved from the Internet <URL: http://www.arcsight.com/product.htm>.

ArcSight, "Product Info: 360° Intelligence Yields Precision Risk Management," date unknown, [online] [Retrieved on Oct. 25, 2002] Retrieved from the Internet <URL: http://www.arcsight.com/product_info01.htm>.

ArcSight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

ArcSight, "Product Info: ArcSight Cross-Device Correlation," date unknown, [online] [Retrieved on Oct. 25, 2005] Retrieved from the Internet <URL: http://www.arcsight.com/product_info03.htm>.

ArcSight, "Product Info: ArcSight Manager," date unknown, [online] [Retrieved on Oct. 25, 2002] Retrieved from the Internet <URL: http://www.arcsight.com/product_info04.htm>.

ArcSight, "Product Info: ArcSight Console," date unknown, [online] [Retrieved on Nov. 15, 2002] Retrieved from the Internet <URL: http:www//arcsight.com/product_info05.htm>.

ArcSight, "Product Info: ArcSight Reporting System," date unknown, [online] [Retrieved on Oct. 25, 2002] Retrieved from the Internet <URL: http:wwww.arcsight.com/product_info06.htm>.

ArcSight, "Product Info: Enterprise Scaling," date unknown, [online] [Retrieved on Oct. 25, 2002] Retrieved from the Internet <URL: http://www.arcsight.com/product_info07.htm>.

ArcSight, "Security Management for the Enterprise," 2002, [online] [Retrieved on Oct. 25, 2002] Retrieved from the Internet <URL: http:www.arcsight.com/>.

Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.

Derodeff, C. "Got Correlation? Not Without Normalization," 2002, [online] Retrieved from the Internet <URL: http://www.svic.com/papers/pdf/Got-Correlation_rmalization.pdf>.

Cheung, S. et al., "Emerald Intrusion Incident Report: 601 Message Specification," Aug. 10, 2000, System Design Laboratory, SRI International.

National Institute of Standards and Technology (NIST), "Federal Information Processing Standards Publlication (FIPS PUB) 199: Standards for Security Categorization of Federal Information and Information Systems", Feb. 2004.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http:///www.sans.org/newlook/resources/IDFAQ/aint.htm>.

Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.

Cert Coordination Center, "Overview of Attack Trends," 2002, [online] Retrieved from the Internet <URL: http://www.cert.org/archive/pdf/attack_trends.pdf>.

Porras, P.A. et al., "EMERALD: Event Monitoring Enabling Responses to Anomalous Live Disturbances," Oct. 1997, Proceedings of the 20th NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newtook/resources/IDFAQ/matching.htm>.

National Institutes of Health (NIH), "Table 1: Security Categorization of Federal Information Systems," revised Jul. 8, 2005, [online] [retrieved on Apr. 6, 2006] Retrieved from the Internet <URL: http://irm.cit.nih.gov/security/table1.htm>.

Wood, M., et al., "Internet-Draft Intursion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

ArcSight, "Enterprise Coverage: Technology Architecture," date unknown, [online] [Retrieved on Nov. 11, 2007] Retrieved from the Internet <URL: http://www.snaiso.com/Documentation/Arcsight/arcsight_archdta.pdf>.

ArcSight, "Managed Process: ArcSight Reporting System," date unknown, [online] [Retrieved on Nov. 11, 2007] Retrieved from the Internet <URL: http://www.snaiso.com/Documentation/Arcsight/arcsight_reportsys.pdf>.

ArcSight, "Managed Process: Console-Based Management," date unknown, [online] [Retrieved on Nov. 11, 2007] retrieved from the Internet <URL: http://www.snaiso.com/Documentation/Arcsight/arcsight_console.pdf>.

ArcSight, "Precision Intelligence: SmartRules™ and Cross-Correlation," date unknown, [online] [Retrieved on Nov. 11, 2007] Retrieved from the Internet <URL: http://www.snaiso.com/Documentation/Arcsight/arcsight_correlation.pdf>.

ArcSight, "Precision Intelligence: SmartAgent™," date unknown, [online] [Retrieved on Nov. 11, 2007] Retrieved from the Internet <URL: http://www.ossmanagement.com/SmartAgent.pdf>.

* cited by examiner even source, and querying events in an event database.

DYNAMIC SECURITY EVENTS AND EVENT CHANNELS IN A NETWORK SECURITY SYSTEM

FIELD OF THE INVENTION

The present invention relates to a computer-based system for capturing security events from heterogeneous and homogenous sources, and querying events in an event database.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. In addition, network devices such as routers and firewalls maintain activity logs that can be used to examine such attempts.

Intrusion detection may be regarded as the art of detecting inappropriate, incorrect or anomalous activity within or concerning a computer network or system. The most common approaches to intrusion detection are statistical anomaly detection and patter-matching detection. IDS that operate on a host to detect malicious activity on that host are called host-based IDS (HIDS), which may exist in the form of host wrappers/personal firewalls or agent-based software, and those that operate on network data flows are called network-based IDS (NIDS). Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

A query for security event can be represented as an event channel. The event channel may be displayed as a grid of events. In one embodiment, the events included in the event channel are dynamic and can change after initial observation. In one embodiment, the present invention includes creating an event channel defined by a timeframe and an event filter, the event channel including security events stored in an event database that satisfy the timeframe and the event filter. When a security event changes after the event channel has been created, one embodiment of the invention further includes observing a change to a security event stored in the event database, and dynamically updating the event channel based on the observed change.

BRIEF DESCRIPTION OF THE DRAWINGS

The present invention is illustrated by way of example, and not limitation, in the figures of the accompanying drawings in which.

DETAILED DESCRIPTION

Figure 1:
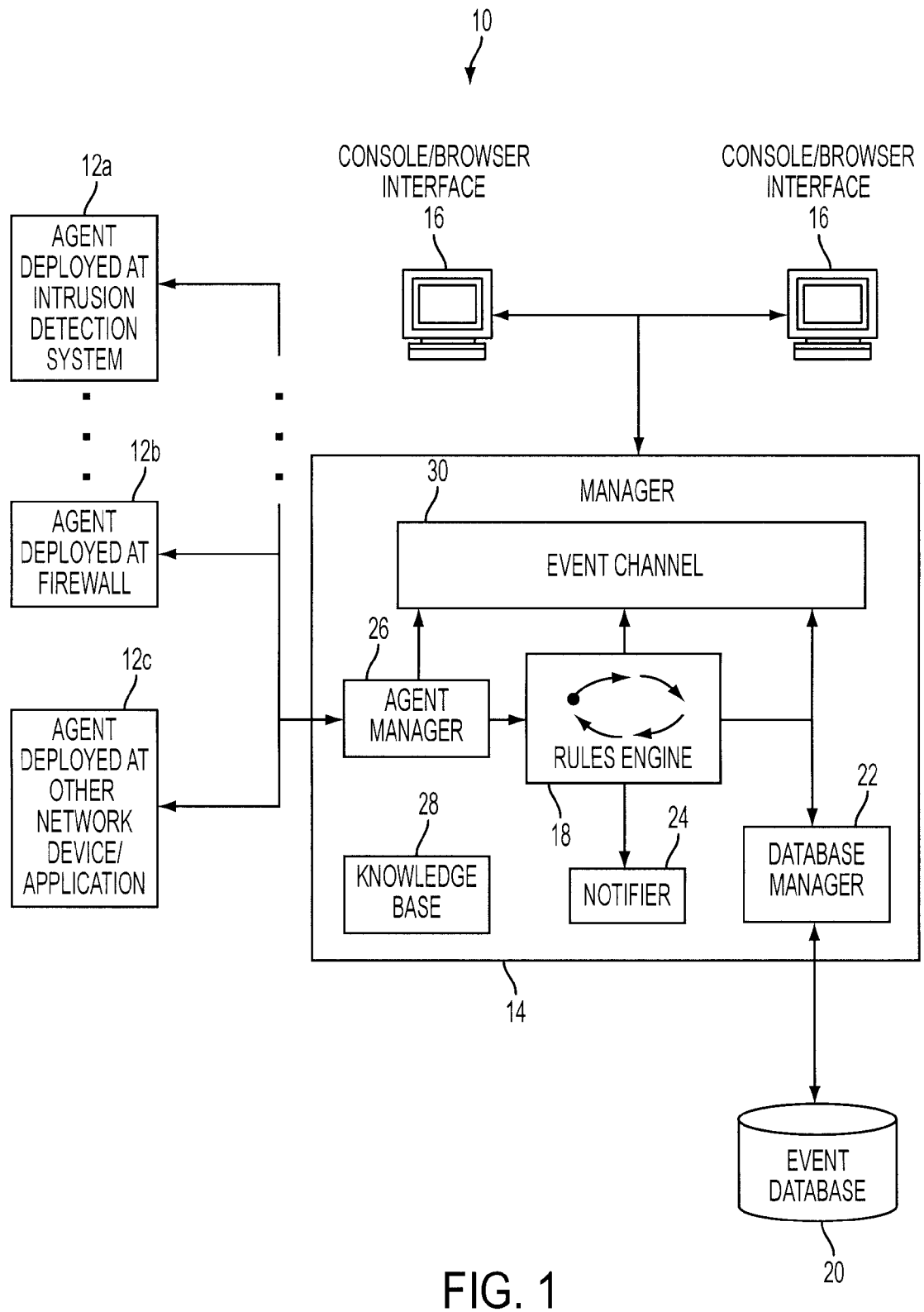
FIG. 1 is a block diagram of a network security system according to one embodiment of the present invention.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based network security system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network security devices, such as firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 may be server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

The exemplary network security system illustrated in FIG. 1 is described in further detail in U.S. application Ser. No. 10/308,415, entitled "Real Time Monitoring and Analysis of Events from Multiple Security Devices", filed Dec. 2, 2002, which is hereby incorporated fully by reference.

In one embodiment, the manager 14 in FIG. 1 implements an event channel 30. An event channel 30 can be described as a query result set that can be accessed by one or more consoles 16. The event channel 30 may be defined by a timeframe, which may be a fixed or a sliding temporal window. For example, the event channel 30 can be defined as all security events from the last two hours.

Additional filters may be used to define the event channel 30. Any event field can be used for such filtering. For example, an event channel can be filtered to include IDS events only. The manager 14 can implement multiple event channels 30 at the same time.

A console accessing the event channel 30 can filter the results displayed further. For example, one user interested only in correlated events over the timeframe of the event channel 30 can set up a console filter accordingly. Even a user interested in the entire channel can set up a console filter to color-code the displayed events. For example, a user may prefer to see correlated (or urgent) events displayed in red. In one embodiment, the event channel 30 is maintained by the manager 14 so long as there is at least one console 16 accessing it, i.e., attached to it via a web client, console, command line tools, or some other mechanism.

In one embodiment, the security events are dynamic. A dynamic security event can be altered—e.g., edited—after it is generated. For example, an event may be initially stored in the event database 20 as an uncorrelated event. However, when a correlated meta-event is generated over a set of events including the previously uncorrelated event, an event field (e.g., "represented by correlated event") can be changed to reflect the changed circumstances. In one embodiment, this change occurs in the event database 20 after the original event was generated by some agent 12.

In one embodiment, security events can be annotated or edited using the console/browser interface 16. Such annotations can be used to assign security events to specific security personnel (users), to dismiss events as irrelevant, or to otherwise describe and mark events. These annotation marks can later be used for filtering. For example, a user may only wish to see event assigned to him by his supervisor.

In one embodiment, to implement a sliding window time frame, the event channel must be dynamic in nature to be able to accommodate new events entering and old events exiting the channel 30. Furthermore, dynamic security events also require that the event channel be dynamic—also referred to as "active"—in nature. For example, an event that belonged to the event channel 30 initially may no longer belong after being annotated or otherwise edited.

Figure 2:
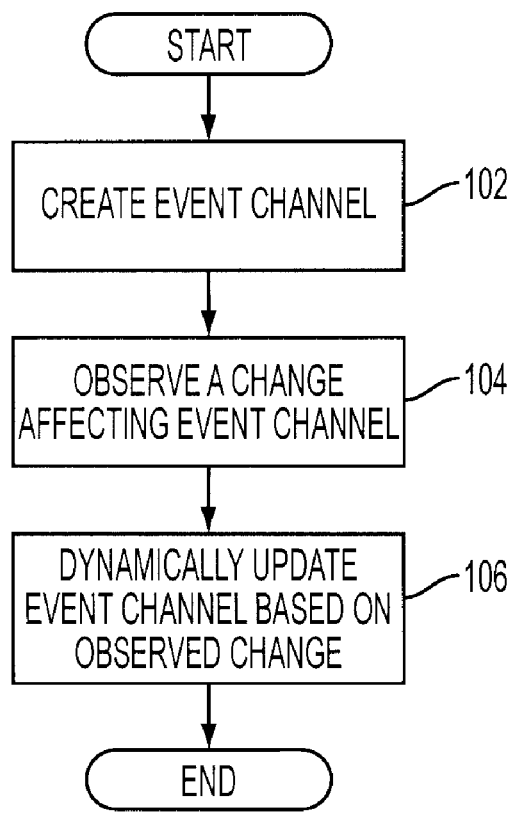
FIG. 2 is a flow chart illustrating active event channel processing according to one embodiment of the present invention.

One embodiment of a process for utilizing an active event channel for the security system of FIG. 1 is now described with reference to FIG. 2. First, the event channel is created in block 102. The event channel can be created in a number of ways as a result of various processes. Any user can use any console 16 to create the event channel. The event channel could also be created as a part of some process, such as the forwarding of events between managers, or between a manager 14 and a web component console 16. To define the channel, a user can specify a timeframe that may be fixed or sliding, and an optional filter to further narrow the event channel definition.

In block 104, a change affecting the event channel is observed. Such change can come from several sources. For example, a user may have used an event editor to annotate an event in the event database 20, and the annotation requires the addition of the event to the event channel. This can happen, for example, if a user set up an event channel for events assigned to him by his supervisor, and the supervisor just assigned the event to this user. Similarly, if the supervisor changes her mind and reassigns the event to another employee, the security event would need to be removed from the created event channel.

Another source for change may be automatic annotation based on some rule. One example—as given above—are events becoming summarized the rules engine 18 as correlated events being marked as having been summarized. An event may be automatically changed if some automated rule adds it to a case (i.e. incident report), or if a network model used to define a channel filter is updated.

Yet another source for change affecting the event channel is caused by the sliding window timeframe definition. A new event may satisfy the event channel definition, thus requiring its addition to the channel. Or an event previously meeting the event channel definition may become expired with the passage of time, necessitating its removal from the channel.

Whatever the source of the change observed in block 104, in block 106 the event channel is updated to reflect the observed change. Thus, a console 16 attached to the event channel will see a dynamically changing event channel, as the channel responds to changes to the security events and the passage of time.

There are several techniques for implementing such an active event channel 30 as is described above with reference to FIGS. 1 and 2. One embodiment of implementing an active event channel is now described with reference to FIGS. 3 to 5. In one embodiment, the query result set defined by the event channel is organized into smaller subsets of security events, herein referred to as "buckets." In one embodiment, each bucket has a statistic associated with it that identifies the number of security events in each bucket. The bucket count can be broken down by priority. In one embodiment, each bucket also includes a key or bucket identifier, and an address of the initial security event in the bucket in the database. Because of the size of the event channel, it is generally not practical to store the event channel 30 on the manager 14. Thus, the events in the buckets are representations only, and the bucket statistic enables the manager 14 to quickly acquire the events in a bucket from the event database 20.

In one embodiment, each bucket represents a portion of the event channel 30, by containing a set of event values corresponding with the events in the bucket. In one embodiment, the event values relate to time, and buckets are defined temporally, as discussed above. In another embodiment, event values relate to event names, and each bucket contains events of the same name up to a maximum event count. If the maximum count is reached, bucket can be further divided by limiting the characters of the event names.

In one embodiment, the consoles 16 display the event channel 30 as a grid or table, in which each row is an event and each column a different event field. In one embodiment, the console 16 only stores events for buckets being displayed. Events from a certain number of adjacent buckets may be stored on the console 16 as well to accommodate scrolling outside of a bucket. Because of the active nature of the event channel 30, when a change occurs in security events being displayed on the grid, the display grid is immediately updated to reflect the change.

Figure 3:
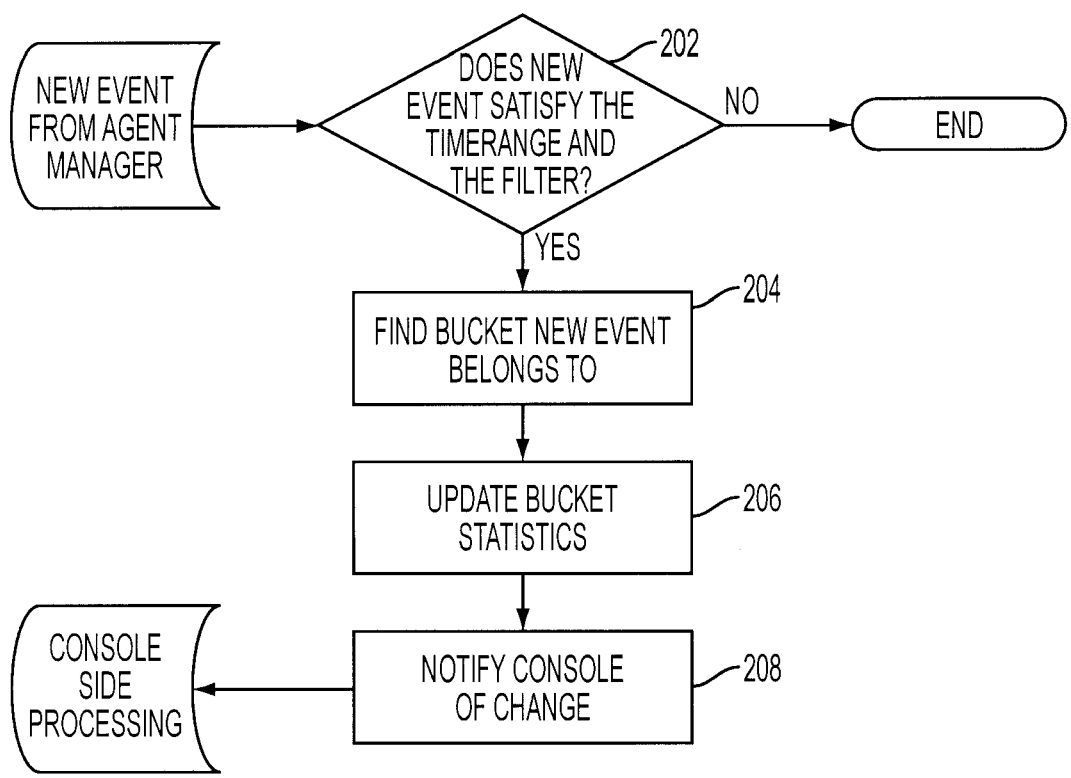
FIG. 3 is a flow chart illustrating new event processing according to one embodiment of the present invention.

As explained above, there are several changes that can affect the event channel 30. One embodiment of new event processing is now set forth with reference to FIG. 3. The process in FIG. 3 is invoked when the agent manager 26 receives a new event. In block 202 a determination is made whether the new event meets the definition of the event channel 30, i.e., falls within the time range and satisfies the filter. If not, the process terminates, as the new security event fails to affect the event channel 30.

If however, the new security event meets the channel definition, then, in block 204, the bucket to which the new event belongs is found. In one embodiment, buckets are defined temporally. For example, if the time range for the event channel is one hour, then there may be 60 one-minute bucket, 12 five-minute buckets, or another such combination. In such an embodiment, a timestamp field (e.g., received time or original detect time) of the security event can be scanned to place the new security event in the proper bucket.

In block 206 the bucket statistic for the appropriate bucket is updated to reflect the addition of the new security event. It is understood, that in one embodiment, placing the new security event in the bucket involves only incrementing the bucket count; the actual security event is stored only in the event database 20. Finally, the console 16—which may sometimes be referred to as the "client" herein while the manager may be referred to as the "server"—is notified. This notification can be extended to all consoles 16 accessing the event channel 30. Console side processing of this notification is described further below with reference to FIG. 5.

In one embodiment, expired security events, i.e., events that no longer meet the time frame of the channel because of the passage of time are not deleted one by one, but are deleted by the bucket when all events in a bucket become stale. Deleting entire buckets provides efficiency further increasing processing speed.

Figure 4A:
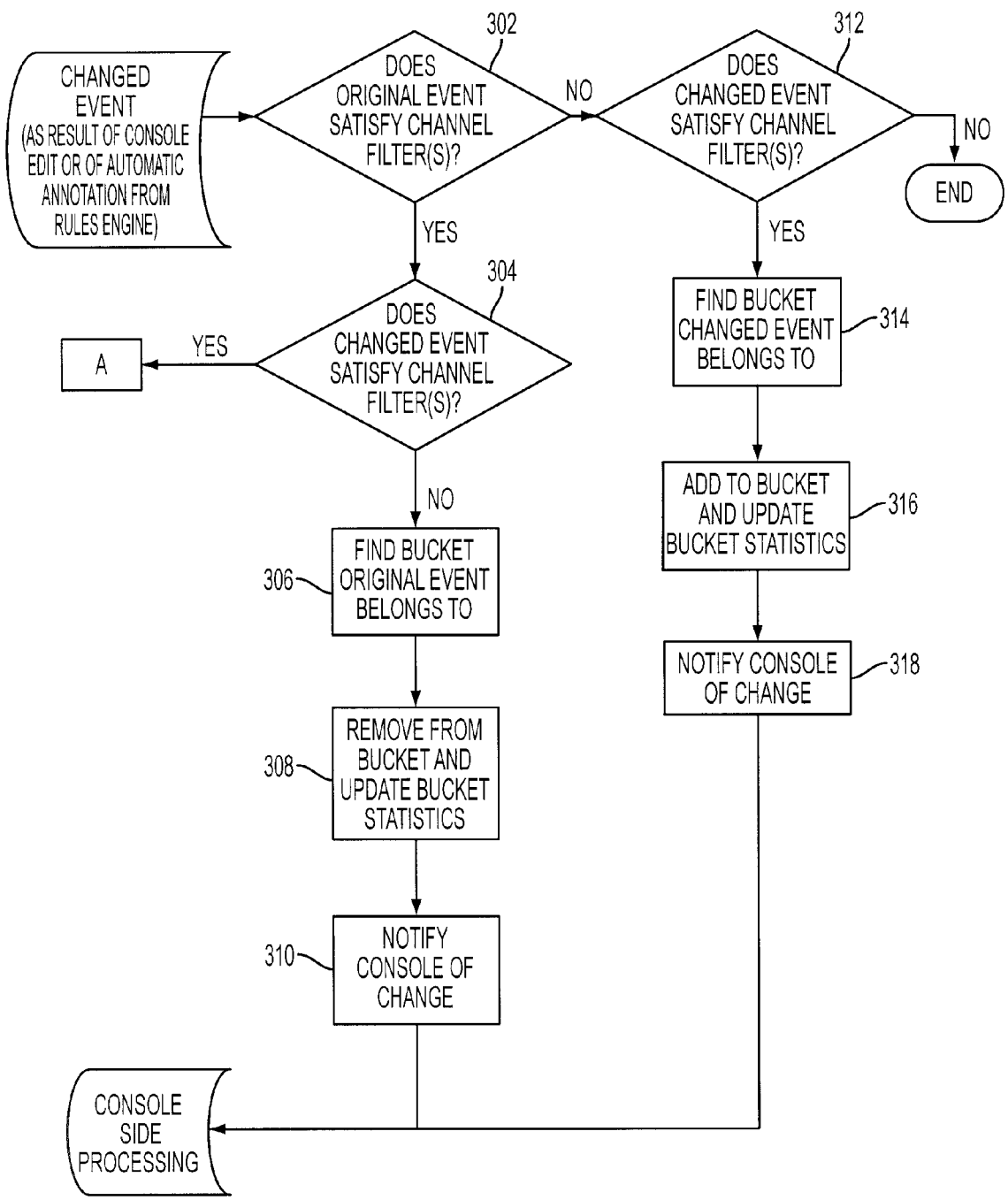
FIG. 4A is a flow chart illustrating changed event processing according to one embodiment of the present invention.

Changed event processing is now described with reference to FIGS. 4A and 4B. As set forth above, in a network security system 10 implementing dynamic security events, previously stored events can change due to manual user editing (event annotation) or automatic rule execution, e.g., correlated summary labeling. The process is activated when, for whatever reason, any field of an event becomes altered.

In block 302, a determination is made whether the original event—i.e., the edited event before it became altered—satisfied the channel condition, in other words, the one or more channel filters set up to define the event channel 30. If so, then, in block 304, another determination is made whether the event as changed satisfies the channel condition. If not, then the event used to be in the event channel, but, as a result of the change, no longer belongs. Accordingly, in block 306 the bucket to which the original event belonged to is identified, the event removed by the updating of the bucket statistics to reflect the change in block 308, and the console 16 is notified in block 310. Console side processing of this notification is described further below with reference to FIG. 5.

If the determination in block 302 is negative, then, in block 312, another determination is made whether the event as changed satisfies the channel condition. If not, then the event channel is unaffected by the change to the security event, and the process terminates. However, if the original security event is found not to be in the channel, but the event as changed is, then the changed event should be added to the event channel 30. Accordingly, in block 314 the bucket to which the changed event belongs to is identified, the event is added by the updating of the bucket statistics to reflect the change in block 316, and the console 16 is notified in block 318. Console side processing of this notification is described further below with reference to FIG. 5.

Figure 4B:
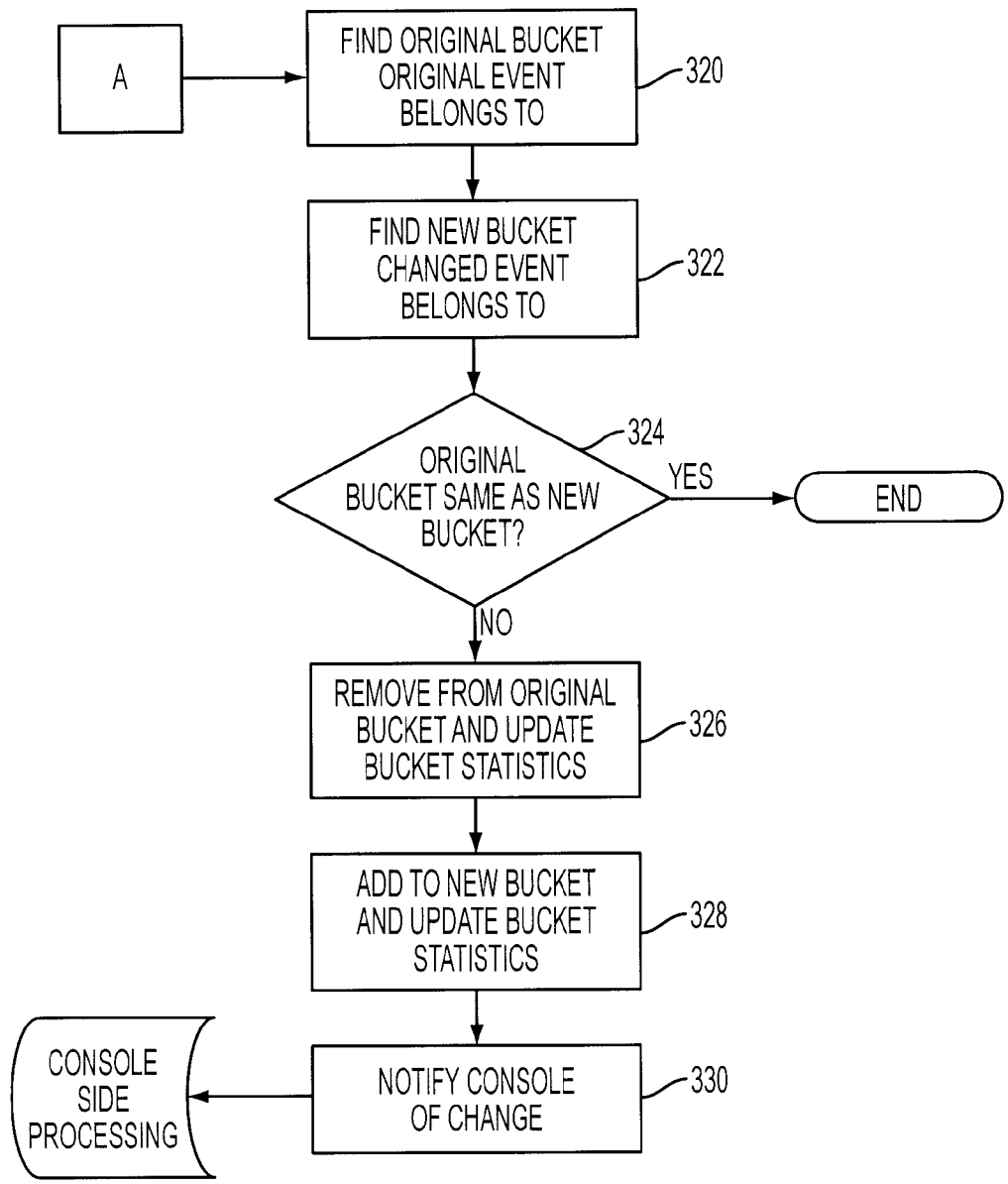
FIG. 4B is a flow chart further illustrating changed event processing according to one embodiment of the present invention.

If, in block 304, it is determined that the changed event as well as the original event satisfies the channel condition, then processing proceeds to block 320 in FIG. 4B. In block 320, the original bucket in which the unedited event was is identified. Similarly, in block 322, the new bucket to which the changed event belongs is identified. Often, the original and the new bucket are identical. If such a determination is made in block 324, then the process terminates.

If, however, it is determined that the original bucket differs from the new bucket, then the security event must be moved from the original to the new bucket. Accordingly, the original event is removed from the original bucket by the updating of the bucket statistics to reflect the change in block 326, and the event is added to the new bucket by the updating of the bucket statistics of the new bucket to reflect the change in block 328. The console 16 is notified of these changes in block 330. If the original bucket is now empty, it is discarded.

Figure 5:
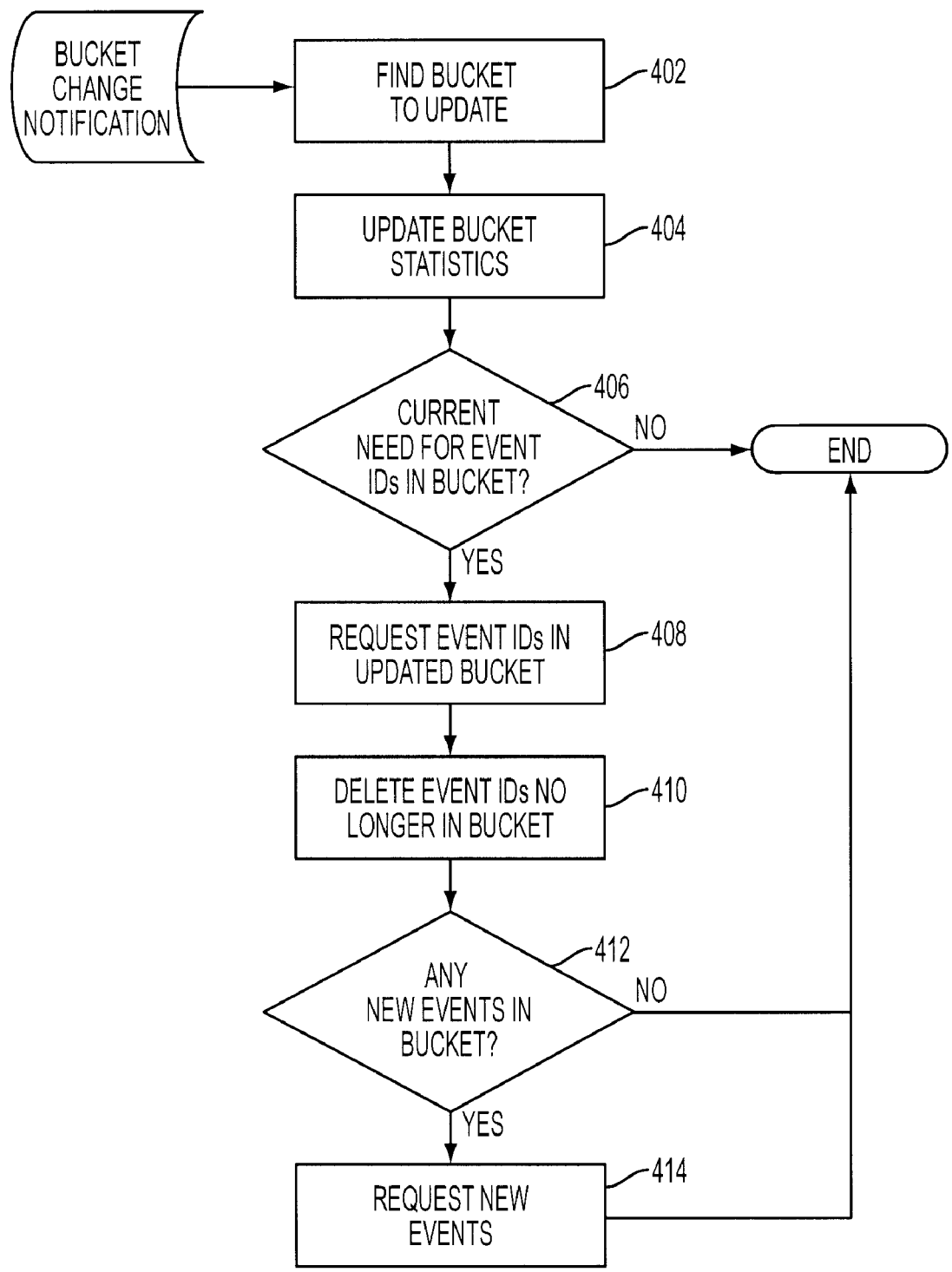
FIG. 5 is a flow chart illustrating console side processing according to one embodiment of the present invention.

Console side processing of these and other notifications is now described with reference to FIG. 5. Upon receiving notification that there has been an update to some bucket, the console 16, in block 402 finds the bucket that was updated, and, in block 404, updates the bucket statistics to reflect the changed event channel 30. In block 406, a determination is made whether there is a current need for the event identifiers contained in the altered bucket. In one embodiment, every security event has a corresponding unique identifier. These identifiers may be globally unique in the system, or made to be unique to some practical point (such as within a year of usage of the system).

In one embodiment, the console 16 only maintains identifiers for security events in buckets that are being currently displayed in the grid, or that are close enough to being displayed—close enough for usual user scrolling up or down the grid. Thus, if the updated bucket is not close enough to being displayed that the console 16 is currently maintaining the event identifiers, then the process terminates.

However, if in block 406 the determination results in the event identifiers being needed, then, in block 408, the event identifiers are requested from the manager 14. The manager 14, in response, can query the event database 20 for the requested event identifiers and provide them to the console 16. The console 16 can thus compare the events of the original bucket to the events in the updated bucket.

In block 410, if an event formerly included in the bucket is no longer among the received identified events, then these events are deleted from the bucket. Similarly, in block 412, a determination is made whether any new events are now included in the updated bucket. If not, the processing can terminate, since there is no change in the bucket. However, if there are one or more new events in the bucket, then the event identifiers for these events are requested by the console 16 in block 414. The manager 14 queries the database 20 for the requested event identifiers, which are provided to the console 16, and the processing terminates.

As described above, the division of the event channel 30 into logical buckets can be done on a temporal basis, or using some other filtering rules, or some combination of such filters. The initial division of the channel 30 into buckets can be configured to optimize the tradeoff between bucket size and the number of buckets. The smaller the bucket size, the faster the transfer of buckets of events; however, the more buckets there are, the higher the overhead for managing them and maintaining bucket statistics for them.

In one embodiment, the bucketization scheme is dynamically reevaluated based on performance. For example, if the number of buckets was initially set too high, then some smaller buckets can be combined to form larger buckets that are fewer in number. Combining buckets can be done by combining the bucket statistics without a need to transfer events across the network.

Thus, a network security system implementing an active event channel has been described. In the foregoing description, various specific values and data structures were given names, such as "event channel" and "bucket," and various specific modules, such as the "agent manager" and "event channel" have been described. However, these names are merely to describe and illustrate various aspects of the present invention, and in no way limit the scope of the present invention. Furthermore, various modules, such as the manager 14, and the consoles 16 in FIG. 1, can be implemented as software or hardware modules, or without dividing their functionalities into modules at all. The present invention is not limited to any modular architecture either in software or in hardware, whether described above or not.

What is claimed is:

1. A method comprising:
creating an event channel that contains a subset of security events stored in an event database, the event channel defined by a timeframe and an event filter, the event channel including security events stored in the event database that satisfy the timeframe and the event filter;
observing a change to a security event stored in the event database; and
dynamically updating the event channel based on the observed change.

2. The method of claim 1, wherein the timeframe comprises a fixed period of time.

3. The method of claim 1, wherein the timeframe comprises a sliding widow of time.

4. The method of claim 3, wherein a beginning point in time and a terminal point in time of the sliding window slide at the same rate.

5. The method of claim 1, wherein the event filter is used to create the event channel by filtering security events based on values contained in specific event fields.

6. The method of claim 1, wherein observing the change to the security event comprises observing a change resulting from a user manually editing the security event.

7. The method of claim 6, wherein the user manually edited the security event using an event editor interface.

8. The method of claim 1, wherein observing the change to the security event comprises observing a change resulting from an automated process editing the security event.

9. The method of claim 8, wherein observing the change to the security event comprises observing the security event becoming represented by a correlated event.

10. The method of claim 1, wherein updating the event channel comprises updating a visual grid display representing the event channel.

11. The method of claim 1, wherein observing the change to the security event comprises receiving the security event as a new security event in the event database.

12. The method of claim 1, wherein updating the event channel comprises:
identifying one or more buckets based on the observed change;
determining whether the one or more buckets need to be updated based on the observed change; and
if the one or more buckets need to be updated, then adjusting bucket statistics associated with the one or more buckets.

13. An apparatus comprising:
an agent manager to gather security events from a plurality of distributed software agents deployed at a plurality of monitor devices;
an event database to store security events gathered by the agent manager;
a user interface to enable a user to edit at least one security event stored in the event database; and
an active event channel containing a subset of the security events stored in the event database, the event channel being configured to automatically update in response to the user editing the at least one security event.

14. The apparatus of claim 13, wherein the user interface is further configured to enable the user to define the event channel.

15. The apparatus of claim 13, wherein the user interface is further configured to a user enable the user to assign the at least one security event to a person or group of persons.

16. The apparatus of claim 13, wherein the user interface is further configured to enable the user to assign the at least one security event to a case, the case comprising a set of related security events.

17. An apparatus comprising:
an agent manager to gather security events from a plurality of distributed software agents deployed at a plurality of monitor devices;
an event database to store security events gathered by the agent manager;
a manager to perform a process and to edit at least one security event stored in the event database as a result of the performed process; and
an active event channel containing a subset of the security events stored in the event database, the event channel being configured to automatically update in response to the manager editing the at least one security event.

18. The apparatus of claim 17, wherein the manager is configured to correlate the stored security events and to mark the at least one security event as being represented by a correlated event.

19. The apparatus of claim 17, wherein the manager is configured to assign the at least one security event to a case, the case comprising a set of related security events.

20. The apparatus of claim 17, further comprising a user interface configured to enable a user to assign the at least one security event to a case, the case comprising a set of related security events.

21. A machine-readable medium having stored thereon data representing instructions that, when executed by a processor, cause the processor to perform operations comprising:
creating an event channel that contains a subset of security events stored in an event database, the event channel defined by a timeframe and an event filter, the event channel including security events stored in the event database that satisfy the timeframe and the event filter;
observing a change to a security event stored in the event database; and
dynamically updating the event channel based on the observed change.

22. The machine-readable medium of claim 21, wherein the timeframe comprises a fixed period of time.

23. The machine-readable medium of claim 21, wherein the timeframe comprises a sliding widow of time.

24. The machine-readable medium of claim 21, wherein the event filter is used to create the event channel by filtering security events based on values contained in specific event fields.

25. The machine-readable medium of claim 21, wherein observing the change to the security event comprises observing a change resulting from a user manually editing the security event.

26. The machine-readable medium of claim 21, wherein observing the change to the security event comprises observing a change resulting from an automated process editing the security event.

27. The machine-readable medium of claim 21, wherein updating the event channel comprises updating a visual grid display representing the event channel.

28. The machine-readable medium of claim 21, wherein observing the change to the security event comprises receiving the security event as a new security event in the event database.

29. The machine-readable medium of claim 21, wherein updating the event channel comprises:

identifying one or more buckets based on the observed change;

determining whether the one or more buckets need to be updated based on the observed change; and if the one or more buckets need to be updated, then adjusting bucket statistics associated with the one or more buckets.

* * * * *

UNITED STATES PATENT AND TRADEMARK OFFICE
CERTIFICATE OF CORRECTION

PATENT NO. : 7,424,742 B1 Page 1 of 1
APPLICATION NO. : 10/976075
DATED : September 9, 2008
INVENTOR(S) : Debabrata Dash et al.

It is certified that error appears in the above-identified patent and that said Letters Patent is hereby corrected as shown below:

Claim 3, column 9, line 33, delete "widow" and insert --window--.

Claim 15, column 10, line 17, after "further configured to" delete "a user".

Claim 23, column 10, line 63, delete "widow" and insert --window--.

Signed and Sealed this

Eleventh Day of November, 2008

JON W. DUDAS
*Director of the United States Patent and Trademark Office*